United States Patent
Ueda et al.

(10) Patent No.: US 11,561,520 B2
(45) Date of Patent: Jan. 24, 2023

(54) POWER CONVERSION SYSTEM WITH PROGRAMMING SUPPORT

(71) Applicant: KABUSHIKI KAISHA YASKAWA DENKI, Kitakyushu (JP)

(72) Inventors: Takeshi Ueda, Fukuoka (JP); William Phillips, Waukegan, IL (US)

(*) Notice: Subject to any disclaimer, the term of this patent is extended or adjusted under 35 U.S.C. 154(b) by 1044 days.

(21) Appl. No.: 16/250,918

(22) Filed: Jan. 17, 2019

(65) Prior Publication Data

US 2019/0229639 A1    Jul. 25, 2019

Related U.S. Application Data

(60) Provisional application No. 62/619,126, filed on Jan. 19, 2018.

(51) Int. Cl.
*G05B 19/042* (2006.01)
*H02M 1/00* (2006.01)
(Continued)

(52) U.S. Cl.
CPC .......... *G05B 19/042* (2013.01); *G05B 19/05* (2013.01); *G06F 8/34* (2013.01); *G06F 9/543* (2013.01);
(Continued)

(58) Field of Classification Search
CPC . G06F 8/34; G06F 9/543; H02P 27/06; H02P 29/00; G05B 19/042; G05B 19/041;
(Continued)

(56) References Cited

U.S. PATENT DOCUMENTS

| 5,005,152 A | 4/1991 | Knutsen |
| 5,377,315 A | 12/1994 | Leggett |

(Continued)

FOREIGN PATENT DOCUMENTS

| CN | 100550591 | 10/2009 |
| JP | H4-023102 | 1/1992 |

(Continued)

OTHER PUBLICATIONS

Office Action issued in Japanese Patent Application No. P2018-032218, dated Nov. 26, 2019 (with English partial translation).
(Continued)

*Primary Examiner* — Ryan Johnson
(74) *Attorney, Agent, or Firm* — Soei Patent & Law Firm

(57) ABSTRACT

A power conversion system includes a power conversion apparatus and a programming support apparatus connected to the power conversion apparatus. The power conversion apparatus includes power conversion circuitry, program storage that stores a control program configured to control the power conversion circuitry, and a control unit that controls the power conversion circuitry according to a control program. The programming support apparatus includes a display data generation unit that generates display data of a block diagram illustrating a content of the control program using a plurality of functional blocks, and a link indicating input and output of information between the functional blocks based on the control program stored in the program storage.

20 Claims, 11 Drawing Sheets

(51) Int. Cl.
  *G06F 8/34* (2018.01)
  *G06F 9/54* (2006.01)
  *G05B 19/05* (2006.01)
  *H02M 5/458* (2006.01)

(52) U.S. Cl.
  CPC ..... *H02M 1/00* (2013.01); *G05B 2219/13107* (2013.01); *G05B 2219/13118* (2013.01); *G05B 2219/23267* (2013.01); *H02M 1/0012* (2021.05); *H02M 5/458* (2013.01); *Y10S 715/967* (2013.01)

(58) Field of Classification Search
  CPC ................ G05B 19/05; G05B 19/056; G05B 2219/13107; G05B 2219/13118; H02M 1/00; H02M 1/0003; H02M 1/0012; Y10S 715/967
  See application file for complete search history.

(56) References Cited

U.S. PATENT DOCUMENTS

| | | | |
|---|---|---|---|
| 5,586,328 | A | 12/1996 | Caron et al. |
| 5,758,123 | A | 5/1998 | Sano et al. |
| 2008/0205092 | A1 | 8/2008 | Sokuza et al. |
| 2018/0032047 | A1* | 2/2018 | Nishizono ............... H02P 29/20 |
| 2018/0329388 | A1 | 11/2018 | Okuyama et al. |

FOREIGN PATENT DOCUMENTS

| | | |
|---|---|---|
| JP | H8-054907 | 2/1996 |
| JP | H10-283020 | 10/1998 |
| JP | 2004-310415 | 11/2004 |
| JP | 5018477 | 6/2012 |
| WO | 2006/112324 | 10/2006 |
| WO | 2009/112130 | 9/2009 |
| WO | 2016/121038 | 8/2016 |

OTHER PUBLICATIONS

Siemens, Free function blocks SINAMICS, Jan. 1, 2011, XP055338709.
Extended Search Report in corresponding European Application No. 19152270.5, dated Jun. 3, 2019.
Siemens, "simatic-programming-guideline Background and System Description", Retrieved from the Internet: URL: https://media.automation24.com/manual/fr/90885040_81318674_Programming_guideline_DOC_v15_en.pdf [retrieved on Jul. 7, 2021], Mar. 1, 2017.
Office Action issued in European Patent Application No. 19152270.5, dated Jun. 17, 2022.
Office Action issued in European Application No. 19152270.5, dated Feb. 13, 2020.
Office Action issued in Chinese Patent Application No. 201910035775.5, dated Aug. 25, 2020 (with English partial translation).

* cited by examiner

*Fig.3*

| 01 | 02 | 03 | 04 | 05 | 06 | 07 | 08 | 09 | ... |
|---|---|---|---|---|---|---|---|---|---|
| 0019 | 0015 | 0031 | 0043 | 008F | 007E | 009B | 0010 | 007E | ... | ured to control of power conversion circuitry from a power conversion apparatus having the power conversion circuitry, and generating display data of a block diagram illustrating a content of the control program using a plurality of functional blocks and a link indicating input and output of information between the functional blocks based on the control program.

POWER CONVERSION SYSTEM WITH PROGRAMMING SUPPORT

CROSS-REFERENCE TO RELATED APPLICATIONS

This application claims the benefit of priority from U.S. Provisional Patent Application No. 62/619,126, filed Jan. 19, 2018, the entire contents of which are incorporated herein by reference.

FIELD

The present disclosure relates to a power conversion system, a programming support apparatus, and a programming support method.

BACKGROUND

Japanese Patent No. 5018477 discloses an inverter that includes an execution code unit storing a table of execution code modules corresponding to specific terminal numbers in advance, a communication interface unit downloading a connection information table indicating an execution order of the execution code modules, and a CPU executing the execution code modules based on the table of the execution code modules and the connection information table.

SUMMARY

Disclosed herein is a power conversion system. The power conversion system may include a power conversion apparatus and a programming support apparatus connected to the power conversion apparatus. The power conversion apparatus may include power conversion circuitry, program storage that stores a control program configured to control the power conversion circuitry, and a control unit that controls the power conversion circuitry according to the control program. The programming support apparatus may include a display data generation unit that generates display data of a block diagram illustrating a content of the control program using a plurality of functional blocks and a link indicating input and output of information between the functional blocks based on the control program stored in the program storage.

Additionally, an example programming support apparatus is disclosed herein. The programming support apparatus may include a program reading unit that reads a control program configured to control of power conversion circuitry from a power conversion apparatus having the power conversion circuitry, and a display data generation unit that generates display data of a block diagram illustrating a content of the control program. The block diagram may illustrate the content of the control program using a plurality of functional blocks and a link indicating input and output of information between the functional blocks based on the control program read by the program reading unit.

Additionally, a programming support method is disclosed herein. The programming support method may include reading a control program configured to control of power conversion circuitry from a power conversion apparatus having the power conversion circuitry, and generating display data of a block diagram illustrating a content of the control program using a plurality of functional blocks and a link indicating input and output of information between the functional blocks based on the control program.

Additionally, a program is disclosed herein. The program may be a program for causing an apparatus to execute a plurality of operations, including reading a control program configured to control of power conversion circuitry from a power conversion apparatus having the power conversion circuitry, and generating display data of a block diagram illustrating a content of the control program using a plurality of functional blocks and a link indicating input and output of information between the functional blocks based on the control program.

Additionally, a storage medium is disclosed herein. The storage medium may include a computer readable storage medium storing a program for causing an apparatus to execute a plurality of operations. The operations may include reading a control program configured to control of power conversion circuitry from a power conversion apparatus having the power conversion circuitry, and generating display data of a block diagram illustrating a content of the control program using a plurality of functional blocks and a link indicating input and output of information between the functional blocks based on the control program.

BRIEF DESCRIPTION OF THE DRAWINGS

FIG. 3 is a table illustrating example sequence data;

DETAILED DESCRIPTION

Hereinafter, example embodiments will be described in detail with reference to the drawings. The same elements or elements having the same function will be denoted by the same reference signs in the description, and redundant descriptions will be appropriately omitted.

Power Conversion System

Figure 1:
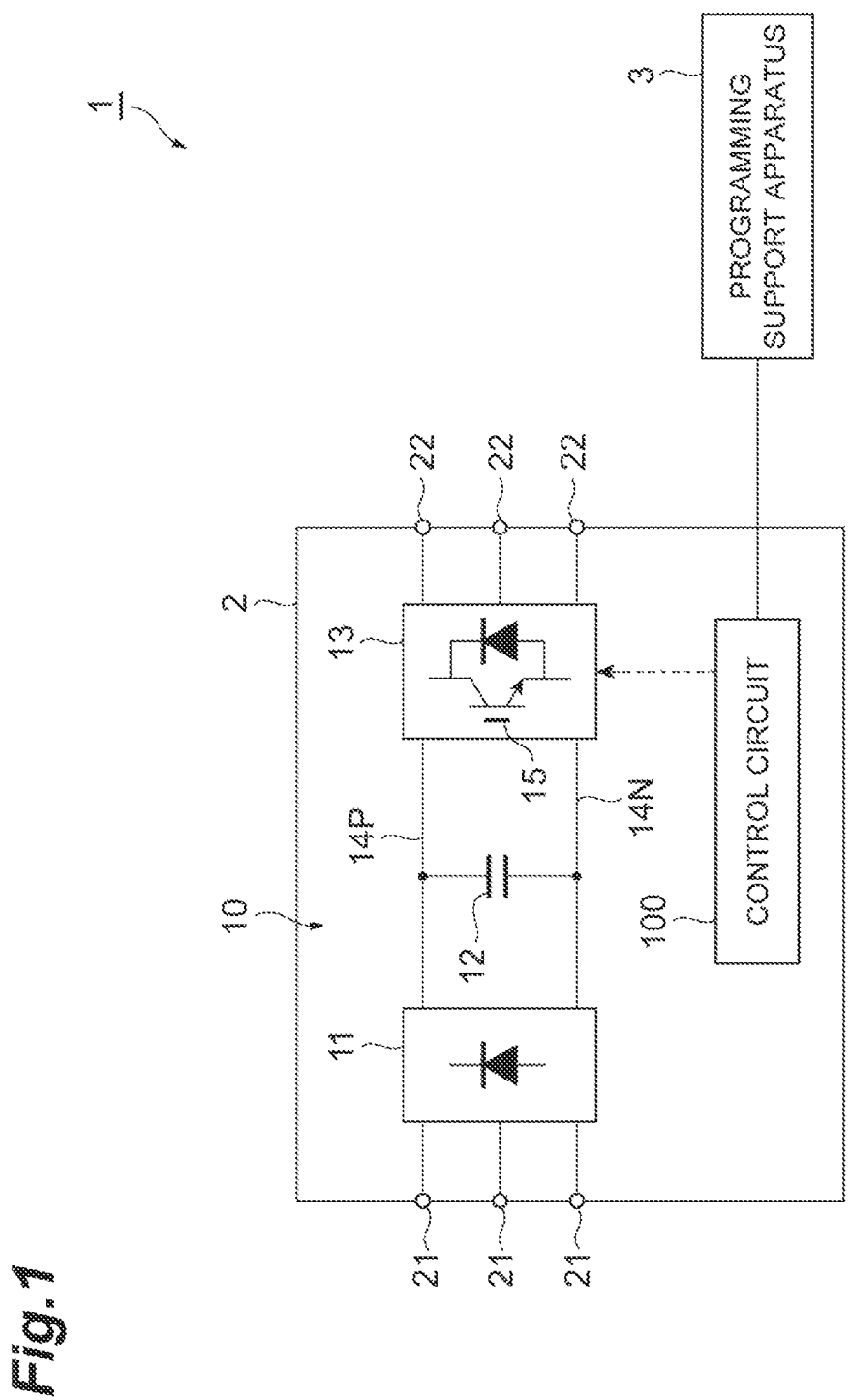
FIG. 1 is a schematic diagram illustrating an example schematic configuration of a power conversion system.

As illustrated in FIG. 1, an example power conversion system 1 includes a power conversion apparatus 2 and a programming support apparatus 3. In some examples, the power conversion system 1 may include a system that generates AC power and outputs the generated AC power to a load (for example, an electric motor). The power conversion apparatus 2 includes power conversion circuitry 10 for power conversion and control circuitry 100 controlling the power conversion circuitry 10. The power conversion circuitry 10 includes a rectifier circuit 11, a capacitor 12, an inverter circuit 13, an AC input terminal 21, and an AC output terminal 22. The rectifier circuit 11 is, for example, a diode bridge circuit, and converts AC power input to the AC input terminal 21 into a DC voltage and outputs the DC voltage to DC buses 14P and 14N. The capacitor 12 is connected between the DC buses 14P and 14N, and smooths the DC voltage between the DC buses 14P and 14N. The inverter circuit 13 is a circuit configured to convert DC power of the DC buses 14P and 14N into AC power and output the AC power to the AC output terminal 22. The inverter circuit 13 includes a plurality of switches 15 such as IGBTs, for example. In some examples, the DC power may be converted into AC power by switching on/off of the plurality of switches 15.

The power conversion circuitry 10 may be configured to control output power. For example, the power conversion circuitry 10 may include circuitry that converts DC input power into AC output power, circuitry that converts AC input power into DC output power, circuitry that converts DC input power into DC output power, or any combination thereof In addition, the power conversion circuitry 10 may include matrix converter circuitry that performs power conversion between AC input power and AC output power without converting AC power into DC power.

Figure 2:
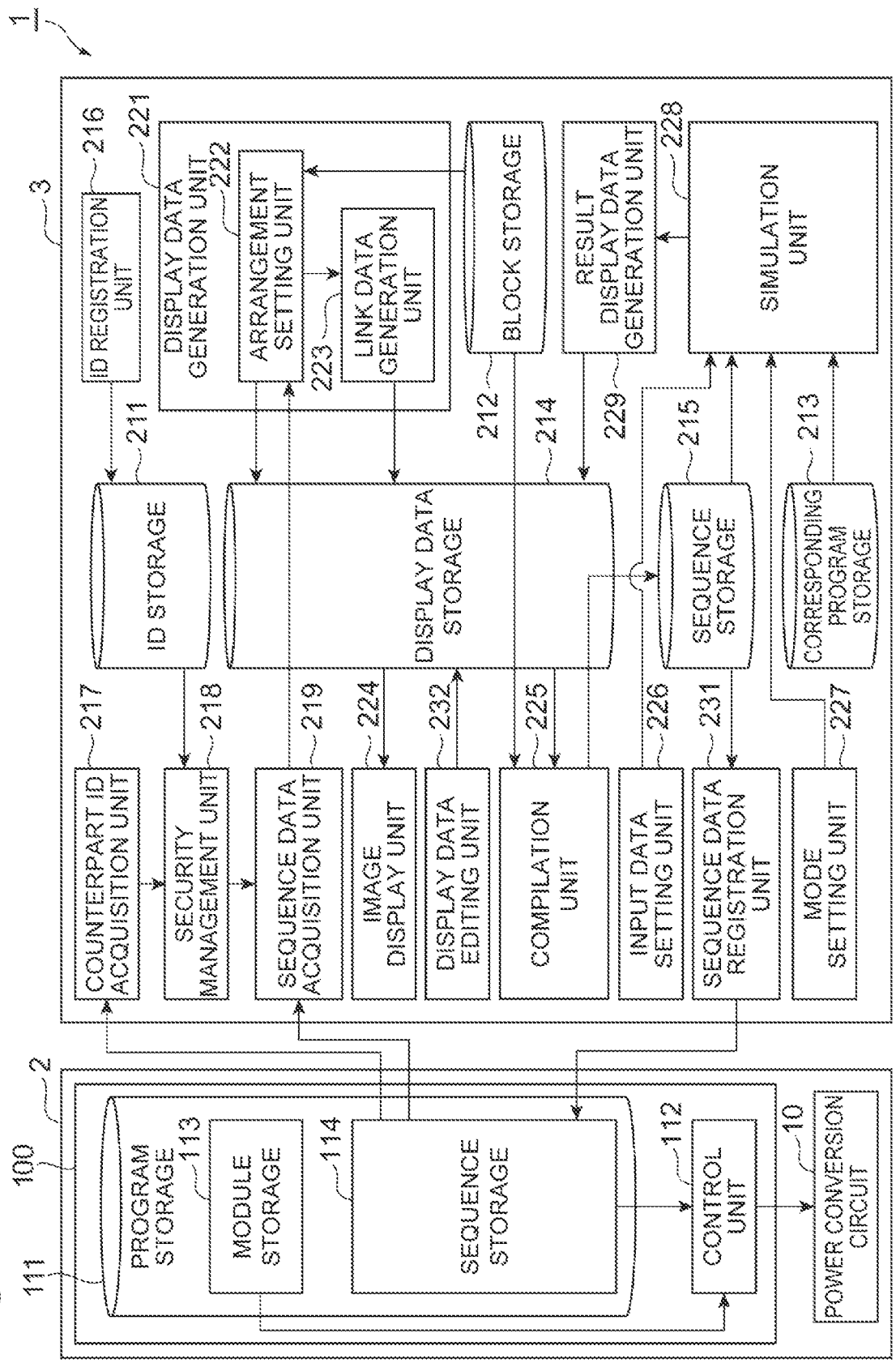
FIG. 2 is a block diagram illustrating an example functional configuration of a power conversion system.

The control circuitry 100 controls the inverter circuit 13 so as to execute power conversion by switching on/off of the switch 15. As illustrated in FIG. 2, an example control circuitry, such as the control circuitry 100, includes program storage 111 and a control device or control unit 112. The program storage 111 stores a control program configured to control the power conversion circuitry 10. For example, the program storage 111 includes module storage 113 and sequence storage 114.

The module storage 113 stores a plurality of program modules. The program module is, for example, an executable program including one or a plurality of functionalized information processing procedures. Various control programs can be configured by changing a combination of a plurality of program modules.

The sequence storage 114 stores sequence data. The sequence data includes data indicating an execution order of a plurality of program modules constituting the control program. FIG. 3 is a table illustrating example sequence data. A numerical value of each cell in an upper row of FIG. 3 indicates an execution order. The numerical value of each cell in the lower row of FIG. 3 indicates an ID of a program module. The sequence storage 114 may be configured to store an ID (or a first user ID) of a user who has set sequence data in addition to the sequence data.

With reference to FIG. 2, the control unit 112 (or control circuitry) controls the power conversion circuitry 10 according to the control program stored in the program storage 111. For example, the control unit 112 generates a gate driving signal according to the control program stored in the program storage 111, and outputs the generated gate driving signal to the switch 15 of the power conversion circuitry 10.

The programming support apparatus 3 supports generation of the control program and communicates with the power conversion apparatus 2 in a wired or wireless manner to transfer information. The programming support apparatus 3 is configured to execute operations including reading the control program from the power conversion apparatus 2 and generating display data of a block diagram based on the control program. The block diagram illustrates a content of the control program using a plurality of functional blocks and a link indicating input and output of information between the functional blocks. The generation of the display data may include generation of a block diagram based on the sequence data stored in the power conversion apparatus 2 and a corresponding relationship between the functional block and the program module.

The programming support apparatus 3 may be further configured to execute an operation of generating sequence data based on the arrangement of the functional blocks and the link of the block diagram. The programming support apparatus 3 may be further configured to execute an operation of storing the sequence data generated by the programming support apparatus 3 itself and an ID of a user stored in the programming support apparatus 3 itself in association with each other in the power conversion apparatus 2. Additionally, the programming support apparatus 3 may be configured to execute an operation of prohibiting the generation of display data based on the control program stored in the power conversion apparatus 2 when the ID stored in the power conversion apparatus 2 does not match the ID stored in the programming support apparatus 3 itself. The programming support apparatus 3 may be further configured to execute operations including setting virtual input data for at least sonic of the functional blocks in the block diagram, executing any of a plurality of program modules corresponding to the plurality of program modules stored in the power conversion apparatus 2 (hereinafter referred to as "corresponding modules") in accordance with the sequence data and the virtual input data, and generating overwrite data for display of an execution result of the corresponding module together with the block diagram.

In some examples, the programming support apparatus 3 includes display data storage 214, block storage 212, a sequence data acquisition device or sequence data acquisition unit 219, a display data generation device or display data generation unit 221, and an image display device or image display unit 224. The display data storage 214 stores display data of a programming support screen (a screen for support of control program generation).

Figure 4:
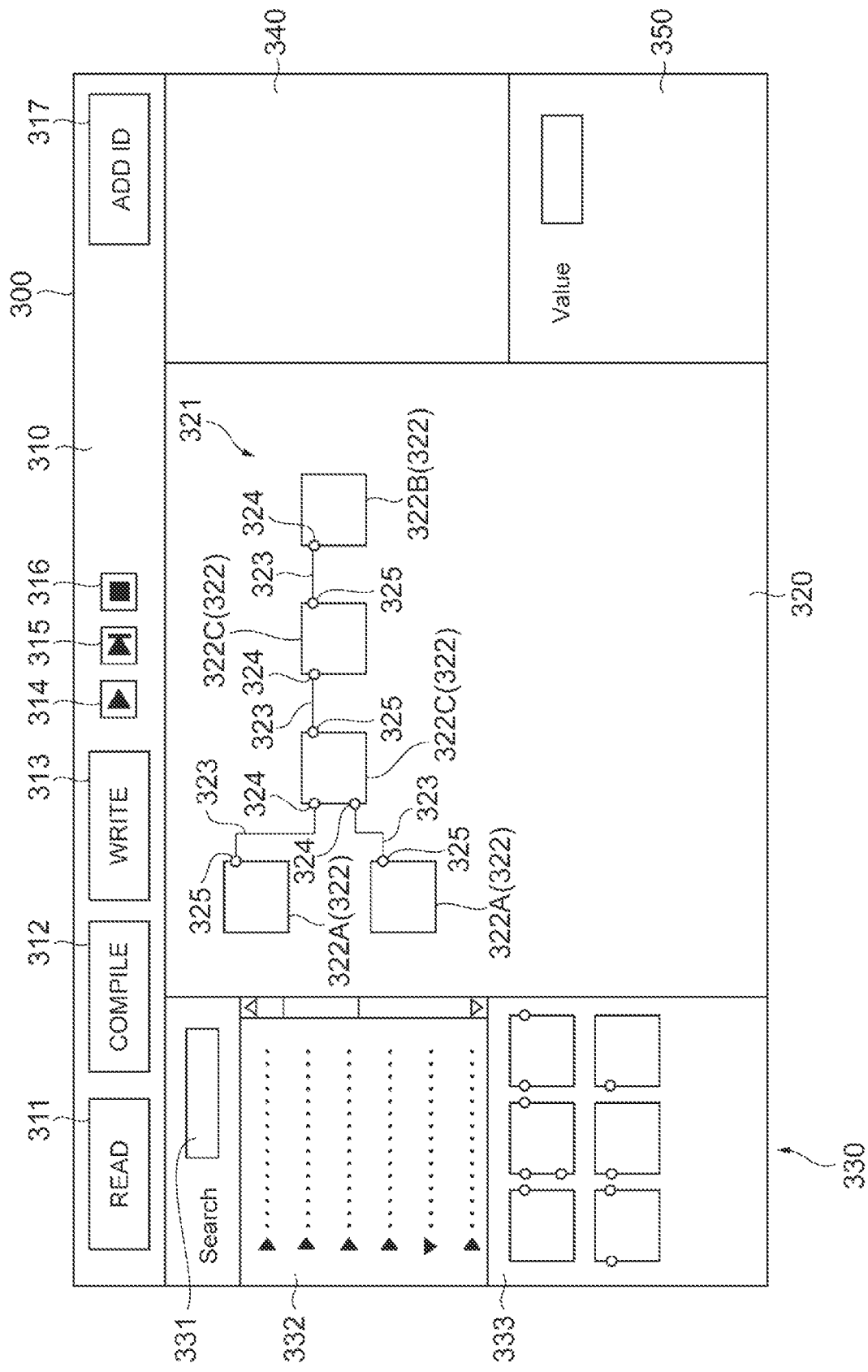
FIG. 4 is a schematic diagram illustrating an example programming support screen.

FIG. 4 is a schematic diagram illustrating an example programming support screen 300. The programming support screen 300 includes a tool bar 310, a block diagram display section 320, a block selection section 330, a property display section 340, and a condition input section 350. The tool bar 310 displays a plurality of tools. The plurality of tools includes, for example, a read button 311, a compile button 312, a write button 313, a continuous execution button 314, a step execution button 315, a stop button 316, and an add ID button 317. The read button 311 is configured to instruct reading of a control program from the power conversion apparatus 2. The compile button 312 is configured to instruct generation of sequence data based on a block diagram. The write button 313 is configured to instruct writing of sequence data to the power conversion apparatus 2. The continuous execution button 314 is configured to instruct execution of simulation in a continuous mode (to be described later). The step execution button 315 is configured to instruct execution of simulation in a step mode (to be described later). The stop button 316 is configured to instruct stop of simulation. Additionally; the add ID button 317 is configured to instruct additional registration of an ID of a user in ID storage 211.

The block diagram display section 320 includes an area configured to display a block diagram 321. The block diagram 321 illustrates a content of a control program using a plurality of functional blocks 322 and a link 323 indicating input and output of information between the functional blocks 322. The functional block 322 acquires information and outputs information based on the acquired information. The functional block 322 may include an input terminal 324 associated with a program module for information input and/or an output terminal 325 associated with a program module for information output. For example, the plurality of functional blocks 322 includes a signal input block 322A, a signal output block 322B, and an intermediate calculation block 322C.

The signal input block 322A is configured to acquire a signal and has the output terminal 325. The output terminal 325 is associated with a program module configured to output information based on the acquired signal to another functional block 322. Examples of the signals to be acquired include signals from sensors inside and outside of the power conversion apparatus 2 or a command signal from the power conversion apparatus 2 or the like. The information based on the acquired signal may be numerical information indicating the acquired signal itself, or may be numerical information obtained by subjecting the signal to predetermined calculation (for example, multiplication by a gain).

The signal output block 322B is configured to output a signal and has the input terminal 324. The input terminal 324 is associated with a program module configured to acquire information output from another functional block 322. The signal output block 322B outputs the signal based on the information acquired by the input terminal 324. Examples of the signals to be output include a frequency command signal for generation of a gate driving signal and the like. The signal based on the acquired information may be a signal indicating the acquired information itself or may be a signal indicating numerical information obtained by subjecting the information to predetermined calculation (for example, multiplication by a gain).

The intermediate calculation block 322C has the input terminal 324 and the output terminal 325. The input terminal 324 is associated with a program module configured to acquire information output from another functional block 322. The output terminal 325 is associated with a program module configured to output information based on the information acquired by the input terminal 324 to another functional block 322. The information based on the acquired information may be the acquired numerical information itself or may be numerical information, obtained by subjecting the numerical information to a predetermined calculation (for example, multiplication by a gain).

The functional block 322 may include a plurality of the input terminals 324 and/or a plurality of the output terminals 325. For example, the intermediate calculation block 322C may include the plurality of input terminals 324 and the single output terminal 325. Additionally, the output terminal 325 may be associated with a program module configured to output information based on a plurality of pieces of information acquired by each of the plurality of input terminals 324 to another functional block 322. Examples of the information based on the plurality of pieces of information include information obtained by adding the plurality of pieces of information and the like.

The link 323 connects the output terminal 325 of one of the functional blocks 322 and the input terminal 324 of any of the others functional blocks 322, and indicates that information from the output terminal 325 is input to the functional block 322.

The block selection section 330 includes an area configured to select the functional block 322 to be added to the block diagram display section 320. For example, the block selection section 330 includes a key input box 331, a category list 332, and a block list 333. The key input box 331 is a text box to input a key configured to search for a desired functional block 322 from the block storage 212. The category list 332 is a list displaying categories of the functional blocks 322. The block list 333 is a list displaying an icon of the functional block 322 corresponding to the key input to the key input box 331 among all the functional blocks 322 belonging to the category selected in the category list 332.

The property display section 340 includes an area displaying a property of the functional block 322 selected in the block diagram display section 320. The condition input section 350 is an area configured to input simulation conditions for the functional block 322 selected in the block diagram display section 320. Examples of the simulation conditions include a condition to specify the signal to be input to the signal input block 322A described above. The condition may be a numerical designation specifying a value of the signal or a waveform designation including a period and an amplitude.

With further reference to FIG. 2, the block storage 212 stores the plurality of functional blocks 322 in association with any of a plurality of program modules. For example, the block storage 212 stores identification information of the input terminal 324 of the functional block 322 and identification information of the program module for information input in association with each other. Additionally, the block storage 212 may store identification information of the output terminal 325 of the functional block 322 and identification information of the program module for information output in association with each other.

The sequence data acquisition unit 219 acquires the sequence data stored in the sequence storage 114 of the power conversion apparatus 2. The display data generation unit 221 generates display data of the block diagram 321 based on the control program stored in the program storage 111 of the power conversion apparatus 2 and stores the generated display data in the display data storage 214. For example, the display data generation unit 221 (or a support circuitry) generates the display data of the block diagram 321 based on the sequence data acquired by the sequence data acquisition unit 219 and a corresponding relationship between the functional block 322 of the block storage 212 and the program module. The display data generation unit 221 may generate the display data of the block diagram 321 such that the output terminal 325 of one of the functional blocks 322 and the input terminal 324 of any other functional block 322 are connected by the link 323. For example, the display data generation unit 221 includes an arrangement setting device or arrangement setting unit 222 and a link data generation device or link data generation unit 223 as further divided constituent elements.

The arrangement setting unit 222 sets an arrangement of the functional blocks 322. The link data generation unit 223 generates display data of the link 323. For example, when the program module (a second program module) associated with the input terminal 324 of the other functional block 322 (a second functional block) is positioned next to the program module (a first program module) associated with the output terminal 325 of the one functional block 322 (a first functional block) in the sequence data acquired by the sequence data acquisition unit 219, the arrangement setting unit 222 sets the arrangement of the functional blocks 322 such that a position of the one functional block 322 and a position of the other functional block 322 differ in a first direction (for example, the lateral direction in FIG. 4). Additionally the link data generation unit 223 generates the display data of the link 323 such that the output terminal 325 of the one functional block 322 and the input terminal 324 of the other functional block 322 are connected to each other. In some examples, "differ in the first direction" means that positions in the first direction are different from each other, and an arrangement relationship in a direction orthogonal to the first direction is not specified.

In addition, when the program module associated with the output terminal 325 of the other functional block 322 is positioned next to the program module associated with the input terminal 324 or the output terminal 325 of the one functional block 322 in the sequence data acquired by the sequence data acquisition unit 219, the arrangement setting unit 222 sets the arrangement of the functional blocks 322 such that the position of the one functional block 322 and the position of the other functional block 322 differ in a second direction intersecting with the first direction (for example, the vertical direction in FIG. 4).

The display data generation unit 221 may generate the display data of the block diagram 321 in accordance with a procedure tracing the execution order in the sequence data (e.g., it may generate the display data of the block diagram 321 in order from the left side in FIG. 4). In other examples, the display data generation unit 221 may generate the display data of the block diagram 321 in accordance with a procedure tracing back the execution order in the sequence data (e.g., it may generate the display data of the block diagram 321 in order from the right side in FIG. 4).

The image display unit 4 displays the programming support screen 300 including the block diagram 321 according to the display data stored in the display data storage 214.

The programming support apparatus 3 may further include the ID storage 211, an ID registration device or ID registration unit 216, a counterpart ID acquisition device or counterpart ID acquisition unit 217, and a security management device or security management unit 218. The ID storage 211 stores an ID (or a second user ID) of a user of the programming support apparatus 3 itself (the programming support apparatus 3 including the ID storage 211). The ID storage 211 may be configured to store IDs of a plurality of users. The ID registration unit 216 acquires an ID of a user that has been additionally input and stores the acquired ID in the ID storage 211.

For example, the ID registration unit 216 displays a dialog box for input of an ID and a password of a user in response to clicking on the add ID button 317 (see FIG. 4). The ID and the password of the user have been issued to the power conversion apparatus 2 in advance, for example, by a manufacturer of the power conversion apparatus 2, and registered in a server or the like of the manufacturer. When an ID and a password of a user are input, the ID registration unit 216 determines whether the ID can be registered, and stores the ID in the ID storage 211 if the ID can be registered. For example, the ID registration unit 216 determines that the ID can be registered when a combination of the input ID and password has been registered in the server or the like, and determines that the ID is prohibited from being registered when the combination is not registered in the server or the like.

The counterpart ID acquisition unit 217 acquires an ID stored in the sequence storage 114 of the power conversion apparatus 2.

The security management unit 218 prohibits the generation of the display data of the block diagram 321 based on the control program stored in the program storage 111 when the ID acquired by the counterpart ID acquisition unit 217 does not match the ID stored in the ID storage 211. For example, the security management unit 218 prohibits the acquisition of sequence data by the sequence data acquisition unit 219. The security management unit 218 may be configured to permit the generation of the display data of the block diagram 321 based on the control program stored in the program storage 111 when the ID acquired by the counterpart ID acquisition unit 217 matches any one of the plurality of IDs stored in the ID storage 211.

In some examples, the security management unit 218 may be provided on the power conversion apparatus 2 side. In this case, the security management unit 218 prohibits, for example, transmission of the sequence data from the sequence storage 114 to the sequence data acquisition unit 219 when the ID stored in the sequence storage 114 does not match the ID stored in the ID storage 211.

The programming support apparatus 3 may further include a display data editing device or display data editing unit 232, a compilation device or compilation unit 225, a sequence storage device or sequence storage 215, a corresponding program storage device or corresponding program storage 213, an input data setting device or input data setting unit 226, a mode setting device or mode setting unit 227, a simulation device or simulation unit 228, a result display data generation device or result display data generation unit 229, and a sequence data registration device or sequence data registration unit 231.

The display data editing unit 232 changes the display data of the display data storage 214 according to an operation input to the programming support screen 300. For example, the display data editing unit 232 changes the display data such that the functional block 322 is added to the block diagram 321 according to a drag completion position when the functional block 322 has been dragged from the block list 333 to the block diagram display section 320. In addition, the display data editing unit 232 changes the display data such that the link 323 connecting the output terminal 325 and the input terminal 324 is added when a drag input from the output terminal 325 of one of the functional blocks 322 in the block diagram display section 320 to the input terminal 324 of the other functional block 322 has been made. In addition, the display data editing unit 232 changes the display data so as to delete the functional block 322 or the link 323 When an input of deleting the functional block 322 or the link 323 has been made in the block diagram display section 320.

The compilation unit 225 performs operations of compiling generated sequence data based on the arrangement of the functional blocks 322 in the block diagram 321 and the link 323 and storing the generated sequence data in the sequence storage 215. For example, the compilation unit 225 generates the sequence data such that two program modules respectively associated with the output terminal 325 and the input terminal 324 connected by the link 323 are sequentially arranged. The arrangement of the functional blocks 322 and the link 323 are obtained from the display data storage 214, for example. The compiling is performed based on the relationship between the functional block 322 and the program module stored in the block storage 212, for example. Incidentally, a process executed by the display data generation unit 221 corresponds to "decompiling" with respect to "compiling" executed by the compilation unit 225.

The corresponding program storage 213 stores a plurality of program modules (corresponding modules) corresponding to the plurality of program modules stored in the module storage 113. The corresponding module includes a simulation program module in the programming support apparatus 3, and is obtained by modifying, for example, the program module stored in the module storage 113 so as to be virtually executable by the programming support apparatus 3. A "virtual execution" means to execute the program module without operating the power conversion apparatus 2.

The input data setting unit 226 sets virtual input data for at least some of the functional blocks 322 in the block diagram 321. For example, the input data setting, unit 226 sets input data based on the content input to the condition input section 350. When the waveform designation including the period and the amplitude has been input in the condition input section 350, the input data setting unit 226 may be configured to set input data of a waveform based on the waveform designation.

The mode setting unit 227 sets an execution mode of the simulation to one of a plurality of modes including a continuous mode and a step mode. The continuous mode is an execution mode in Which execution of a series of program modules in accordance with sequence data is repeated. The step mode is an execution mode in which execution of a program module is interrupted whenever one or more program modules (hereinafter referred to as "a set of program modules") are executed. For example, the mode setting unit 227 sets the execution mode to the continuous mode when the continuous execution button 314 has been clicked, and sets the execution mode to the step mode when the step execution button 315 has been clicked.

Examples of the set of program modules to be executed in the step mode include program modules for one control cycle (a series of program modules repeated in the continuous mode). For example, the step mode may be set such that the execution of the program module is interrupted at every control cycle. The set of program modules may include program modules associated with the single functional block 322. For example, the step mode may be set such that the execution of the program module is interrupted for each of the functional blocks 322 Additionally, the mode setting unit 227 may be configured to be capable of customizing a set of program modules according to user's designation.

The simulation unit 228 executes the simulation operation in the execution mode set by the mode setting unit 227. For example, the simulation unit 228 executes the program module stored in the corresponding program storage 213 in accordance with the sequence data generated by the compilation unit 225 and the virtual input data set by the input data setting unit 226.

The result display data generation unit 229 generates overwrite data for display of the execution result of the program module by the simulation unit 228 on the block diagram display section 320 and stores the generated overwrite data in the display data storage 214. For example, the result display data generation unit 229 generates the overwrite data such that a numerical value calculated by the execution of the program module is displayed in the vicinity of the functional block 322 corresponding to the program module.

The sequence data registration unit 231 stores the sequence data stored in the sequence storage 215 by the compilation unit 225 and any of the IDs stored in the ID storage 211 in the sequence storage 114 of the power conversion apparatus 2 to be associated with each other.

Figure 5:
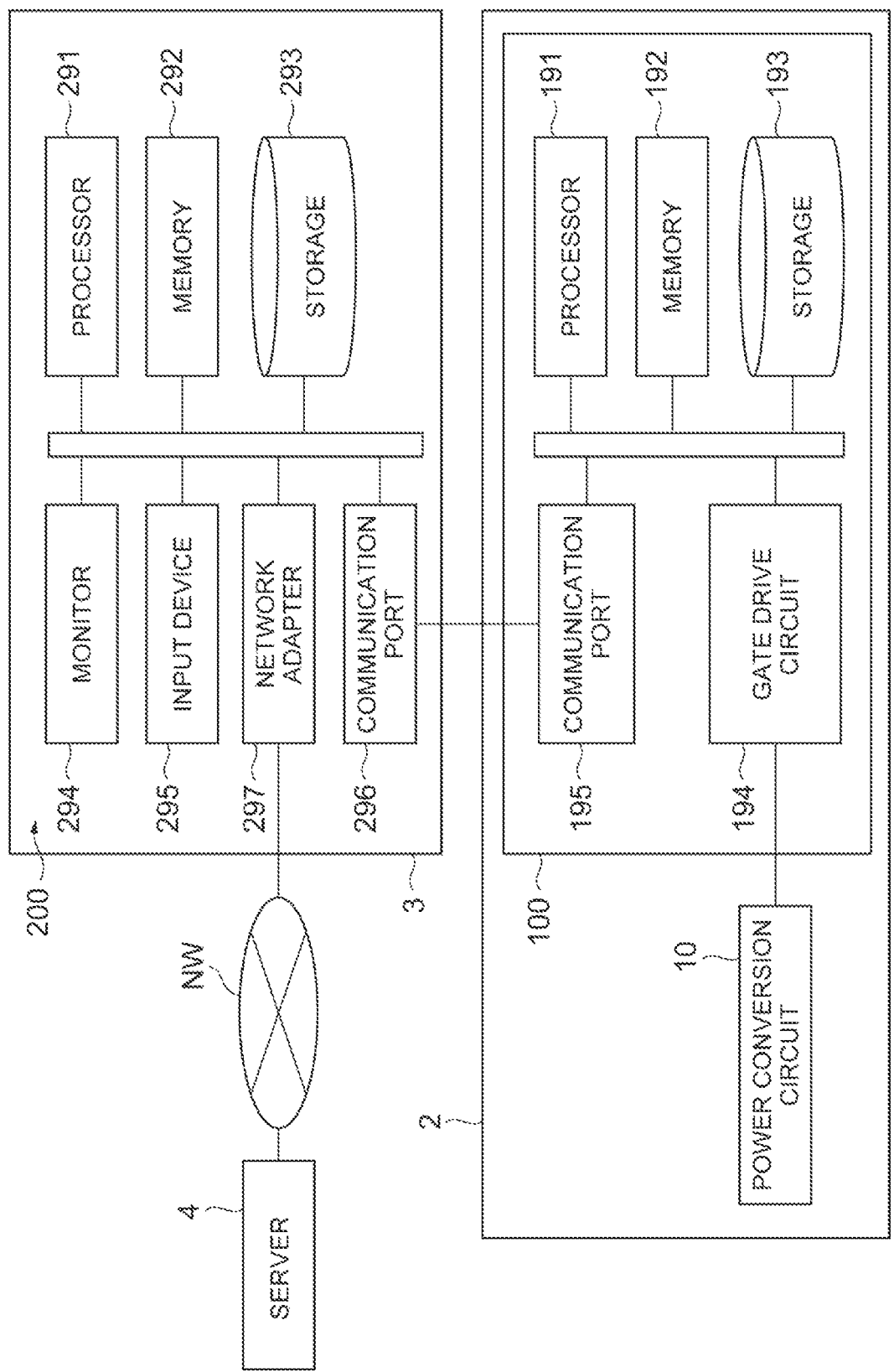
FIG. 5 is a block diagram illustrating an example hardware configuration of a power conversion system.

FIG. 5 is a block diagram illustrating an example hardware configuration of a power conversion system, such as the power conversion system 1. As illustrated in FIG. 5, the control circuitry 100 includes a processor 191, a memory 192, a storage 193, a gate drive circuit 194, and a communication port 195. The storage 1193 is a computer-readable nonvolatile storage medium (for example, a hard disk or a flash memory). The storage 193 includes a storage area of a program configured to construct the control unit 112 and storage areas allocated to the module storage 113 and the sequence storage 114. The memory 192 temporarily stores a program loaded from the storage 193, a result of calculation by the processor 191, and the like. The processor 191 functions as the control unit 112 by executing the above-described program in cooperation with the memory 192. The gate drive circuit 194 outputs a gate driving signal to the inverter circuit 13 in accordance with a command from the processor 191. The communication port 195 transmits and receives data to and from the programming support apparatus 3 in accordance with the command from the processor 191.

The programming support apparatus 3 includes programming support circuitry 200. The programming support circuitry 200 includes a processor 291, a memory 292, storage 293, a monitor 294, an input device. 295, a communication port 296, and a network adapter 297. The storage 293 is a computer-readable nonvolatile storage medium (for example, a hard disk or a flash memory). The storage 293 stores a program to cause an apparatus to execute operations including reading the control program from the power conversion apparatus 2 and generating the display data of the block diagram 321 based on the control program.

The program may be configured to cause the programming support apparatus 3 to generate the display data of the block diagram 321 based on the sequence data stored in the power conversion apparatus 2 and the corresponding relationship between the functional block 322 and the program module.

The program may be configured to cause the programming support apparatus 3 to generate the display data of the block diagram 321 such that the output terminal 32 of one of the functional blocks 322 and the input terminal 324 of any other functional block 322 are connected by the link 323.

The program may be configured, when the program module associated with the input terminal 324 of the other functional block 322 is positioned next to the program module associated with the output terminal 325 of the one functional block 322 in the sequence data stored in the power conversion apparatus 2, to cause the programming support apparatus 3 to set the arrangement of the functional blocks 322 such that a position of one of the functional blocks 322 and a position of any other functional block 322 differ in the first direction, and to cause the programming support apparatus 3 to generate the display data of the link 323 such that the output terminal 325 of the one functional blocks 322 and the input terminal 324 of the other functional block 322 are connected.

The program may be configured to, when the program module associated with the output terminal 325 of the other functional block is positioned next to the program module associated with the input terminal 324 or the output terminal 325 of the one functional block 322 in the sequence data stored in the power conversion apparatus 2, cause the programming support apparatus 3 to set the arrangement of the functional blocks 322 such that a position of one of the functional blocks 322 and a position of any other functional block 322 differ in the second direction intersecting with the first direction.

The program may be further configured to cause the programming support apparatus 3 to generate the sequence data based on the arrangement of the functional blocks 322 in the block diagram 321 and the link 323.

The program may be further configured to cause the programming support apparatus 3 to execute operations including storing the sequence data generated by the programming support apparatus 3 itself and an ID of a user stored in the programming support apparatus 3 itself in association with each other in the power conversion apparatus 2, and prohibiting the generation of display data based on the control program stored in the power conversion apparatus 2 when the ID stored in the power conversion apparatus 2 does not match the ID stored in the programming support apparatus 3 itself.

The program is configured to store IDs of a plurality of users in the programming support apparatus 3 itself, and may be configured to permit generation of display data based on the control program stored in the power conversion apparatus 2 when the ID stored in the power conversion apparatus matches any one of the IDs stored in the programming support apparatus 3.

The program may be further configured to cause the programming support apparatus 3 to execute, for at least some of the functional blocks 322 in the block diagram 321, operations including setting the virtual input data executing any of the corresponding modules in accordance with the sequence data and the virtual input data, and generating overwrite data for display of an execution result of the corresponding module together with the block diagram 321.

The program may be configured to cause the programming support apparatus 3 to set the input data of the waveform based on the waveform designation including the cycle and the amplitude.

Additionally, the program may be configured to cause the programming support apparatus 3 to execute operations including setting the execution mode of the simulation in the programming support apparatus 3 to any of the plurality of modes including the continuous mode and the step mode and executing the corresponding program module in the set execution mode.

In some examples, the storage 293 includes a storage area allocated to the ID storage 211, the block storage 212, the corresponding program storage 213, the display data storage 214, and the sequence storage 215 among the plurality of elements of the programming support apparatus 3 illustrated in FIG. 2, and a storage area of a program to construct the other elements.

The monitor 294 includes, for example, an image display apparatus such as a liquid crystal monitor and is used as, for example, the image display unit 224. The input device 295 includes an information input device such as a keypad, for example, and is used for an operation input to the programming support screen 300 displayed on the monitor 294. The monitor 294 and the input device 295 may be integrated such as a so-called touch panel. The communication port 296 transmits and receives data to and from the communication port 195 of the power conversion apparatus 2 in response to a command from the processor 291. The network adapter 297 is connected to a server 4 or the like of a manufacturer of the power conversion apparatus 2 via a network line NW such as the Internet and transmits and receives data to and from the server 4 in response to a command from the processor 291. The network adapter 297 is used for the determination on whether an ID registration can be performed by the ID registration unit 216, or the like. In some examples, the network line NW may be interposed between the communication port 296 and the communication port 195.

Programming Support Procedure

Next, an example programming support procedure executed by the programming support apparatus 3 will be described. The programming support procedure includes: a procedure (decompiling procedure) of generating the display data of the block diagram 321 based on the control program stored in the power conversion apparatus 2, and a procedure (compiling procedure) of generating sequence data based on the arrangement of the functional blocks 322 and the link 323 in the block diagram 321. Additionally, the programming support procedure may include a procedure (simulation procedure) of simulating the sequence data generated in the compiling procedure, and a procedure (sequence registration procedure) of storing the sequence data generated by the compiling procedure in the power conversion apparatus 2. Hereinafter, contents of the respective procedures will be described in additional detail.

Decompiling Procedure

Figure 6:
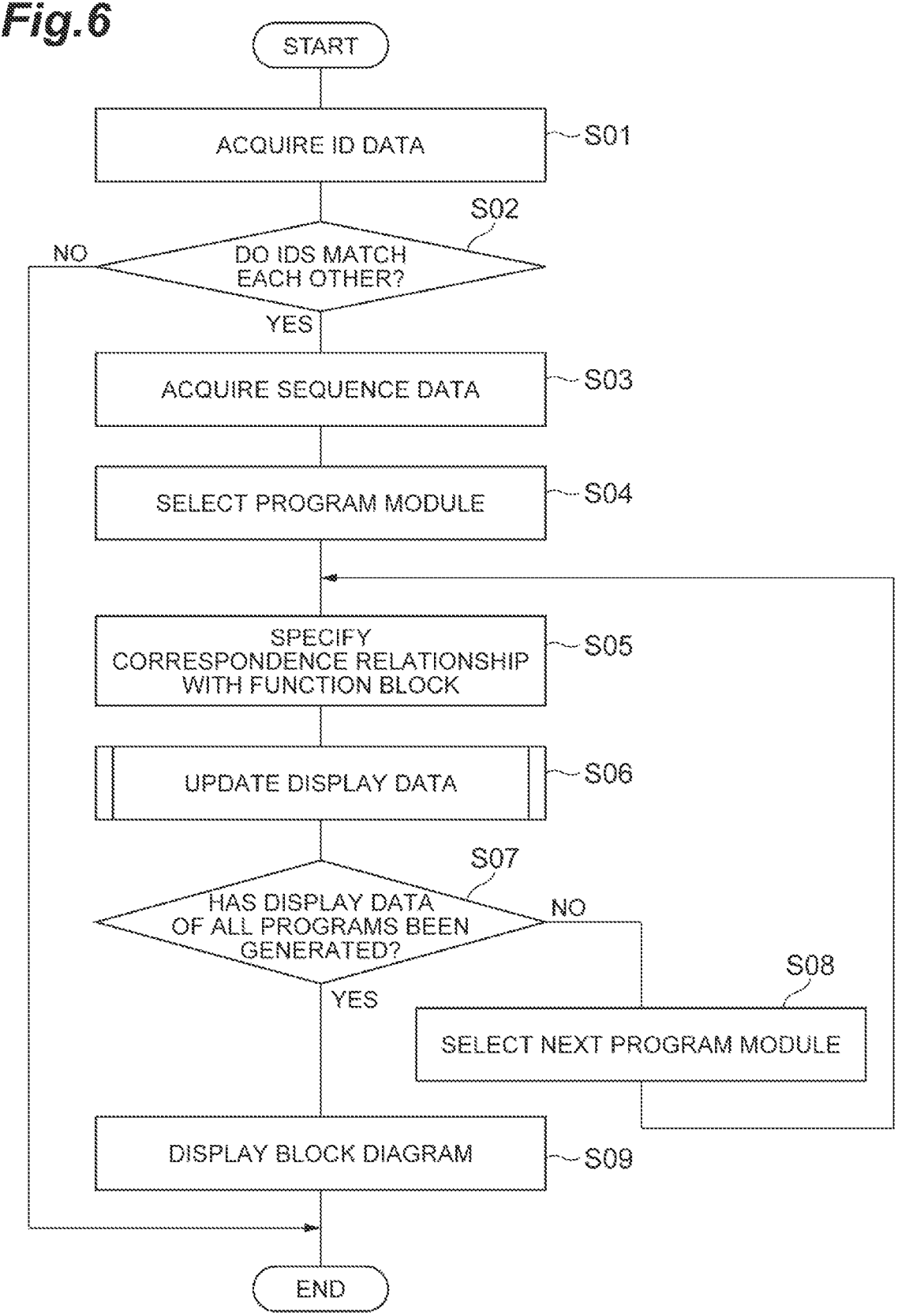
FIG. 6 is a flowchart illustrating an example decompiling procedure.

As illustrated in FIG. 6, the programming support apparatus 3 executes a number of operations or steps. The operations may be performed sequentially, for example, when the programming support apparatus 3 executes Steps S01 and S02. In Step S01, the counterpart ID acquisition unit 217 acquires the ID stored in the sequence storage 114 of the power conversion apparatus 2. In Step S02, the security management unit 218 confirms whether an ID acquired by the counterpart ID acquisition unit 217 matches one of the plurality of IDs stored in the ID storage 211. If it is determined in Step S02 that the ID acquired by the counterpart ID acquisition unit 217 does not match any of the plurality of IDs stored in the ID storage 211, the security management unit 218 prohibits the acquisition of the sequence data performed by the sequence data acquisition unit 219. As a result, the programming support apparatus 3 stops the decompiling without executing Steps S03 to S09.

If it is determined in Step S02 that the ID acquired by the counterpart ID acquisition unit 217 matches any one of the plurality of IDs stored in the ID storage 211, the programming support apparatus 3 executes Step S03. In Step S03, the sequence data acquisition unit 219 acquires the sequence data stored in the sequence storage 114 of the power conversion apparatus 2.

In Step S04, the display data generation unit 221 selects the first program module from the sequence data acquired in Step S03.

Following Step S04, in some examples, the programming support apparatus 3 sequentially executes Steps S05, S06, and S07. In Step S05, the display data generation unit 221 specifies any functional block 322 with which the program module that has been selected in Step S04 is associated. For example, the display data generation unit 221 refers to the block storage 212 to specify which terminal (the input terminal 324 or the output terminal 325) of which functional block 322 the program module is associated with. In Step S06, the display data generation unit 221 updates the display data of the block diagram 321 based on the sequence data acquired in Step S03, and the corresponding, relationship between the functional block 322 and the program module specified in Step S05 and stores the updated display data in the display data storage 214. An example processing content of Step S06 will be described later. In Step S07, the display data generation unit 221 confirms whether generation of display data of the entire control program has been completed. For example, the display data generation unit 221 confirms whether program modules that have not been selected as the object to be executed in Steps S05 and S06 remain in the sequence data.

If it is determined in Step S07 that the generation of display data of the entire control program has not been completed, the programming support apparatus 3 executes Step S08. In Step S08, the display data generation unit 221 selects the immediately subsequent program module (i.e., the next program module in the sequence data). Thereafter, the programming support apparatus 3 returns the process to Step S05. Thereafter, the programming support apparatus 3 repeats the selection of the program module and the update of the display data of the block diagram 321 until the generation of display data of the entire control program is completed.

If it is determined in Step S07 that the generation of display data of the entire control program has been completed, the programming support apparatus 3 executes Step S09. In Step S09, the image display unit 224 displays the block diagram 321 based on the display data, generated by repeating Steps S05, S06, S07, and S08, on the programming support screen 300. The decompiling procedure may then be completed as above.

Figure 7:
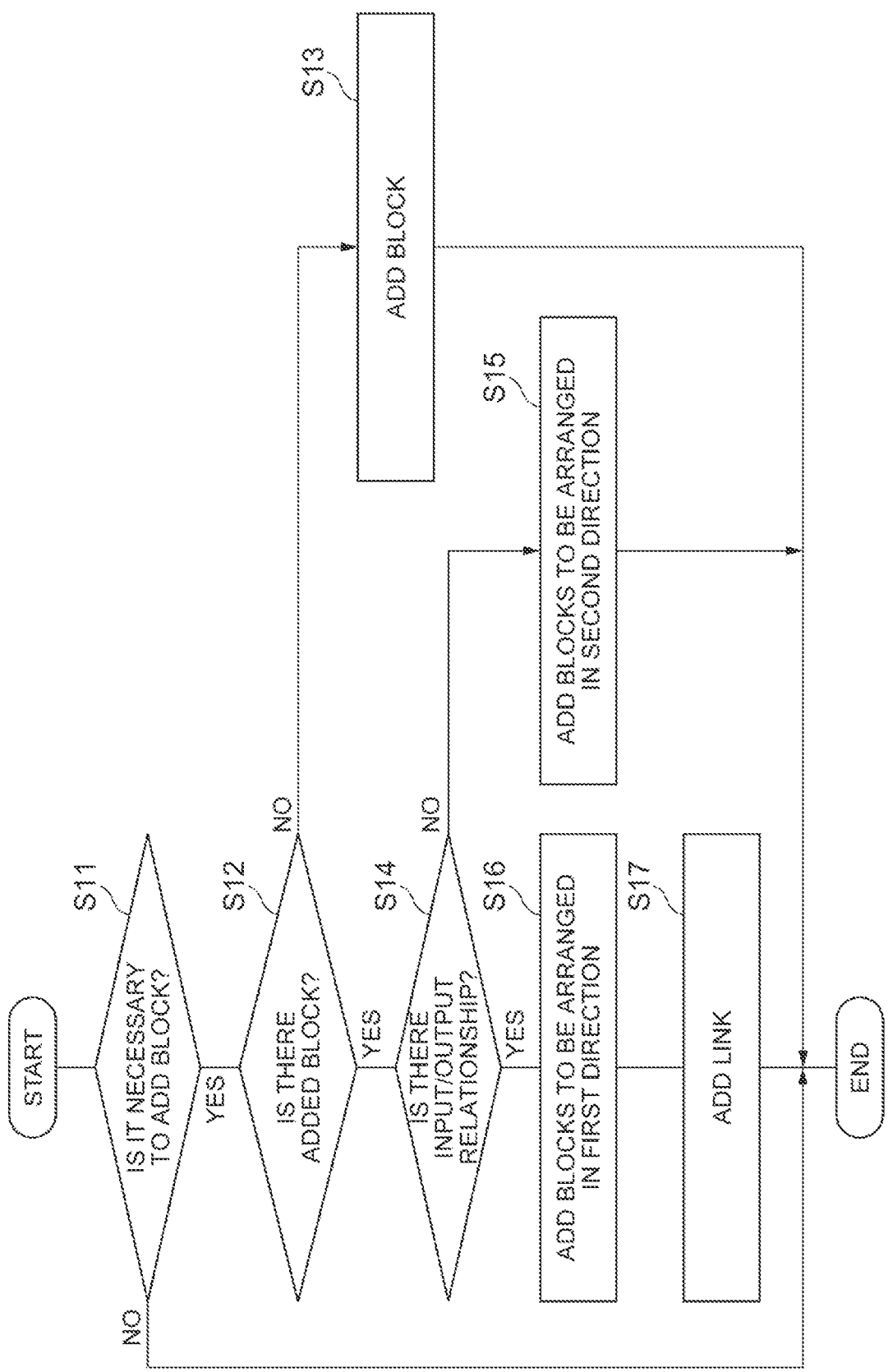
FIG. 7 is a flowchart illustrating an example display data generation procedure.

FIG. 7 is a flowchart illustrating an example update procedure of the display data in Step S06. The programming support apparatus 3 may start the update procedure by executing Step S11. In Step S11, the arrangement setting unit 222 confirms whether it is necessary to add the functional block 322 to the block diagram 321. In some examples, if the functional block 322 associated with the currently selected program module exists in the display data of the block diagram 321, the arrangement setting unit 222 determines that it is unnecessary to add the functional block 322. On the other hand, if the functional block 322 does not exist in the display data of the block diagram 321, the arrangement setting unit 222 determines that it is necessary to add the functional block 322.

If it is determined in Step S11 that it is unnecessary to add the functional block 322, the programming support apparatus 3 completes the update procedure of the display data. If it is determined in Step S11 that it is necessary to add the functional block 322, the programming support apparatus 3 executes Step S12. In Step S12, the arrangement setting unit 222 confirms whether the functional block 322 other than the functional block 322 as an object to be added exists in the display data of the block diagram 321.

If it is determined in Step S12 that there is no other functional block 322, the programming support apparatus 3 executes Step S13. In Step S13, the arrangement setting unit 222 adds the functional block 322 as the object to be added to the display data of the block diagram 321.

If it is determined in Step S12 that the other functional block 322 exists, the programming support apparatus 3 executes Step S14. In Step S14, the arrangement setting unit 222 confirms whether there is an information input/output relationship between the functional block 322 as the object to be added and the other functional block 322. For example, if the selected program module is associated with the input terminal 324 of the functional block 322 as the object to be added and a program module coming immediately before the program module (i.e., the immediately preceding program module in the sequence data) is associated with the output terminal 325 of the other functional block 322, the arrangement setting unit 222 determines that there is the input/output relationship. When the selected program module is associated with the output terminal 325 of the functional block 322 as the object to be added, the arrangement setting unit 222 determines that there is no input/output relationship.

If it is determined in Step S14 that there is no such input/output relationship, the programming support apparatus 3 executes Step S15. In Step S15, the arrangement setting unit 222 adds the functional block 322 as the object to the display data in an arrangement of deviating in the second direction with respect to the functional block 322 associated with the preceding program module.

If it is determined in Step S14 that there is the input/output relationship, the programming support apparatus 3 sequentially executes Steps S16 and S17. In Step S16, the display data generation unit 221 adds the functional block 322 as the object to the display data in an arrangement of deviating in the first direction with respect to the functional block 322 associated with the preceding program module. In Step S17, the link data generation unit 223 adds the display data of the link 323 to connect the output terminal 325 associated with the immediately preceding program module and the input terminal 324 associated with the selected program module. The update procedure of the display data may then be completed as above.

In Step S04, the last program module may be selected instead of the first program module. In this case, the immediately preceding program module (e.g., the previous or prior program module in the sequence data which precedes the last program module) is selected in Step S08 instead of the immediately subsequent program module (e.g., the next program module in the sequence data). In Step S14, if the selected program module is associated with the output terminal 325 of the functional block 322 as the object to be added and the immediately subsequent program module is associated with the input terminal 324 of the other functional block 322, the arrangement setting unit 222 determines that there is the input/output relationship. When the selected program module is associated with the input terminal 324 of the functional block 322 as the object to be added, the arrangement setting unit 222 determines that there is no input/output relationship.

Compiling Procedure

Figure 8:
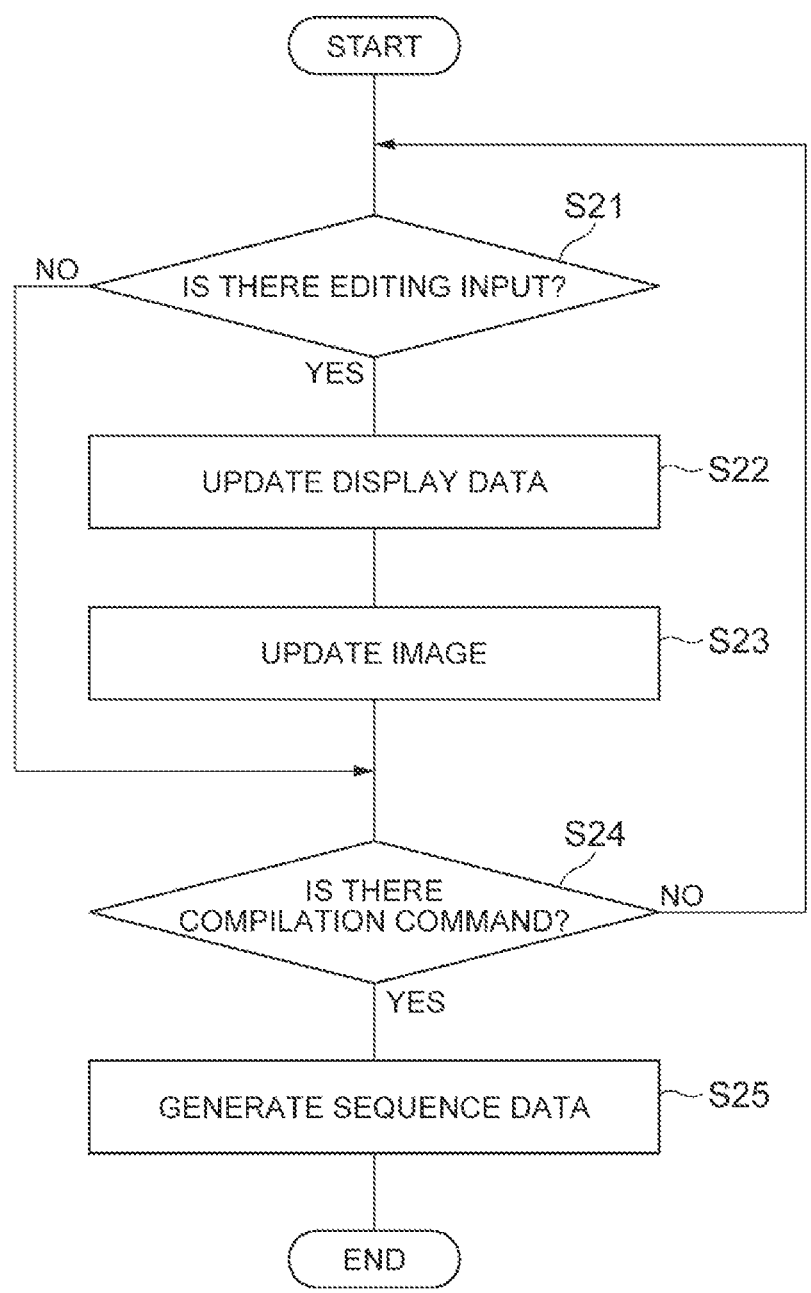
FIG. 8 is a flowchart illustrating an example compilation procedure.

The programming support apparatus 3 may start the example compiling procedure illustrated in FIG. 8 by executing Step S21. In Step S21, the display data editing unit 232 confirms whether an operation input for changing the display of the block diagram 321 (hereinafter referred to as an "editing input") has been made on the programming support screen 300.

If it is determined in Step S21 that the editing input has been made, the programming support apparatus 3 sequentially executes Steps S22 and S23. In Step S22, the display data editing unit 232 updates the display data of the block diagram 321 according to the editing input and stores the updated display data in the display data storage 214. In Step S23, the image display unit 224 displays the block diagram 321 on the programming support, screen 300 based on the display data stored in the display data storage 214.

If it is determined in Step S21 that no editing input has been made, the programming support apparatus 3 executes Step S24 without executing Steps S22 and S23. In Step S24, the compilation unit 225 confirms whether there is a compilation execution command (for example, clicking of the compile button 312). If it is determined in Step S24 that there is no compilation execution command, the programming support apparatus 3 returns the process to Step S21. Thereafter, updating of the display of the block diagram 321 according to the operation input to the programming support screen 300 is repeated until it is determined that there is a compilation execution command.

If it is determined in Step S24 that there is a compilation execution command, the programming support apparatus 3 executes Step S25. In Step S25, the compilation unit 225 generates sequence data based on the arrangement of the functional blocks 322 in the block diagram 321 and the link 323 and stores the generated sequence data in the sequence storage 215. For example, the compilation unit 225 generates the sequence data such that two program modules respectively associated with the output terminal 325 and the input terminal 324 connected by the link 323 are sequentially arranged. The compiling procedure may then be completed as above.

Simulation Procedure

Figure 9:
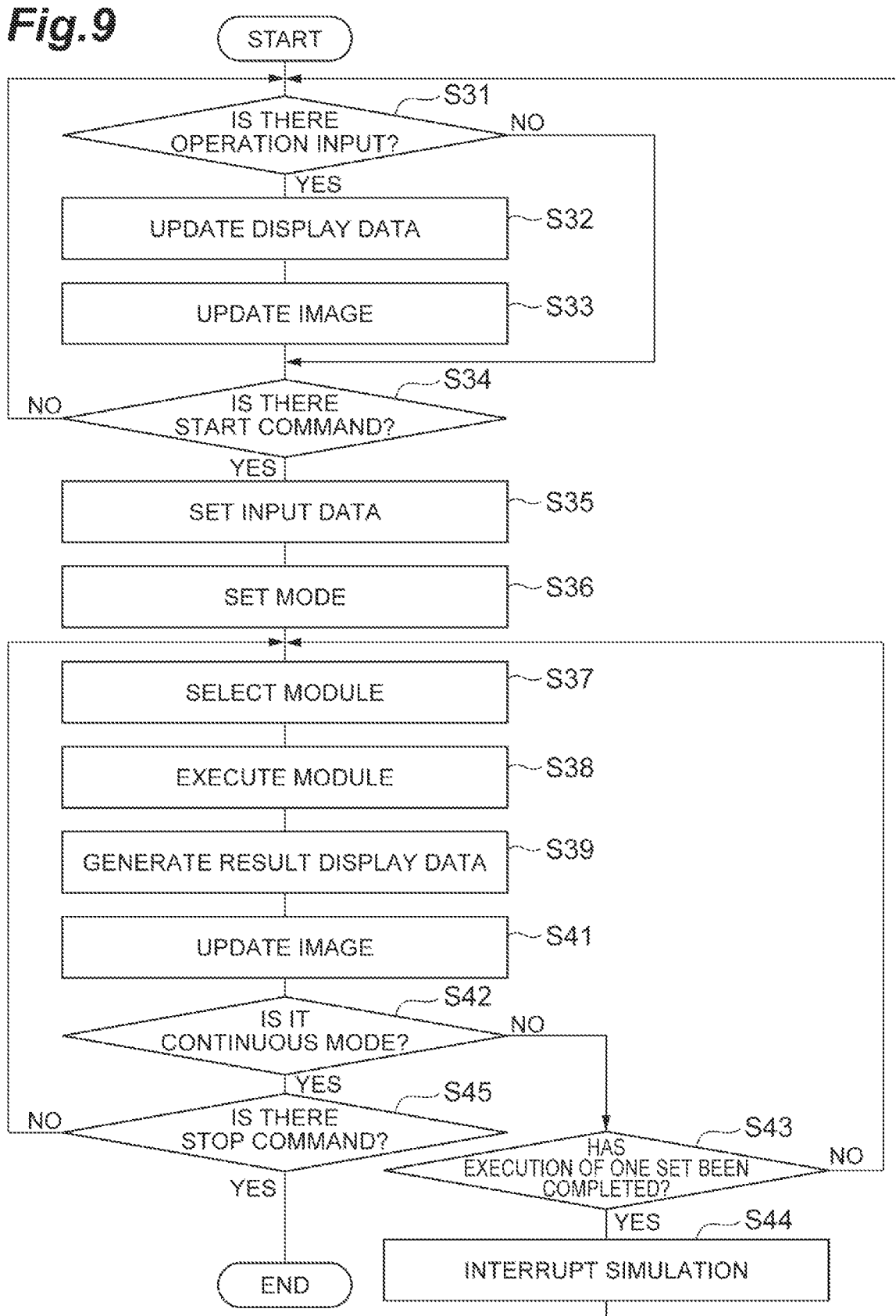
FIG. 9 is a flowchart illustrating an example simulation procedure.

The programming support apparatus 3 may start the example simulation procedure illustrated in FIG. 9 by executing Step S31. In Step S31, the display data editing unit 232 confirms whether an input to the condition input section 350 (hereinafter referred to as a "condition input") has been made. If it is determined in Step S31 that the condition input has been made, the programming support apparatus 3 executes Step S32. In Step S32, the display data editing unit 232 updates the display data of the condition input section 350 according to the condition input and stores the updated display data in the display data storage 214. In Step S33, the image display unit 224 updates the display of the condition input section 350 based on the display data stored in the display data storage 214.

If it is determined in Step S31 that the condition input has not been made, the programming support apparatus 3 executes Step S34 without executing Steps S32 and S33. In Step S34, the mode setting unit 227 confirms the presence or absence of a simulation start command (for example, clicking of the continuous execution button 314 or the step execution button 315). If it is determined in Step S34 that there is no simulation start command, the programming support apparatus 3 returns the process to Step S31. Thereafter, updating of the display of the condition input section 350 according to the condition input is repeated until it is determined that there is a simulation start command.

If it is determined in Step S34 that there is a simulation start command, the programming support apparatus 3 sequentially executes Steps S35 and S36. In Step S35, the input data setting unit 226 sets the input data based on the content input to the condition input section 350. In Step S36, the mode setting unit 227 sets a simulation execution mode to one of the plurality of modes including the continuous mode and the step mode. For example, the mode setting unit 227 sets the execution mode to the continuous mode when the continuous execution button 314 has been clicked for the simulation start command. Additionally, the mode setting unit 227 may set the execution mode to the step mode when the step execution button. 315 has been clicked for the simulation start command.

Figure 10:
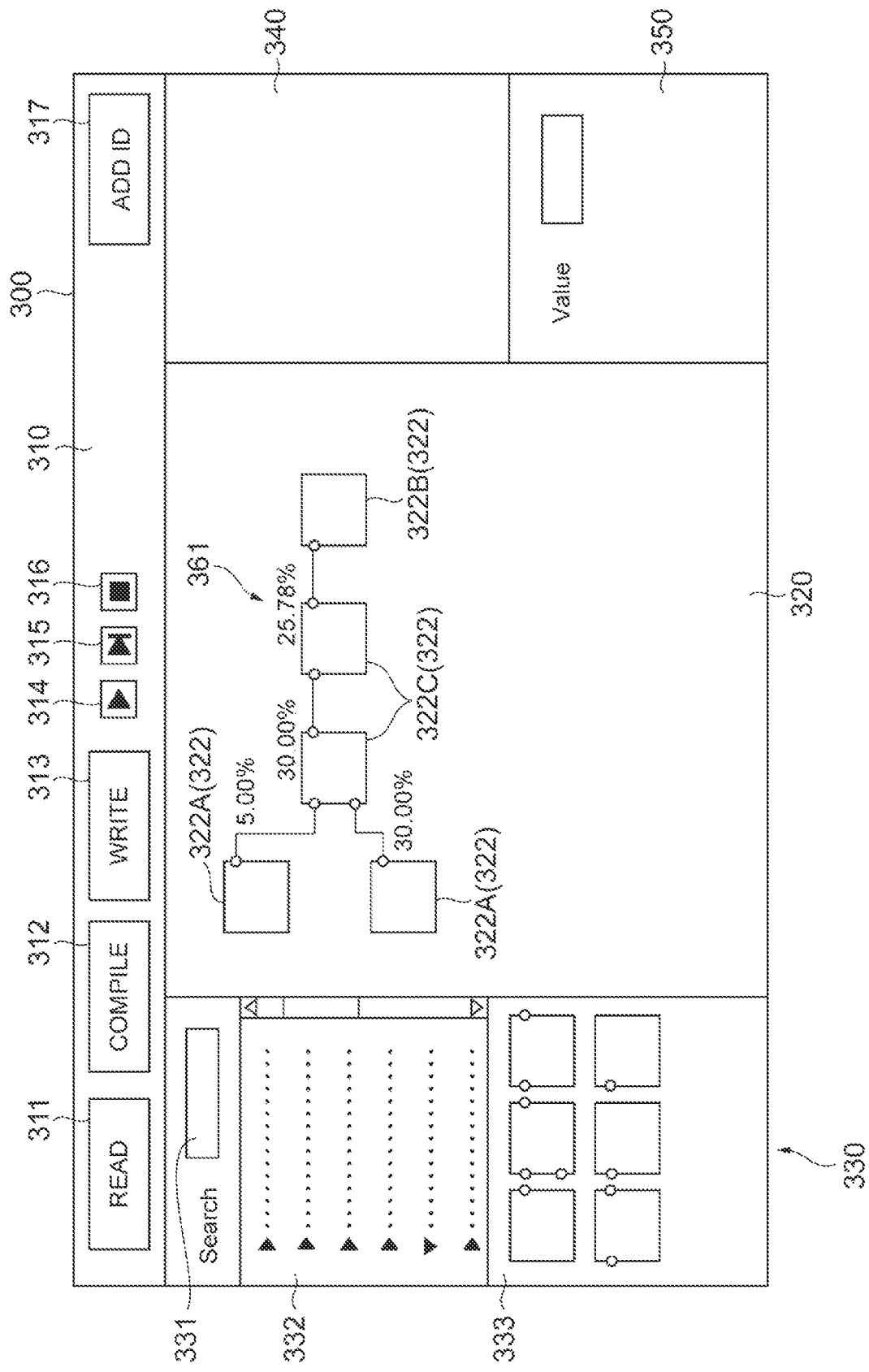
FIG. 10 is a schematic diagram illustrating an example programming support screen during simulation.

In some examples, the programming support apparatus 3 may sequentially execute Steps S37, S38, S39, and S41. In Step S37, the simulation unit 228 selects a program module as an object to be executed from the corresponding program storage 213 according to the sequence data stored in the sequence storage 215. In Step S38, the simulation unit 228 executes the program module selected in Step S37. In Step S39, the result display data generation unit 229 generates overwrite data to display an execution result of the program module performed by the simulation unit 228 together with the block diagram 321 (for example, in the block diagram 321), and stores the generated overwrite data in the display data storage 214. In Step S41, the image display unit 224 updates the display of the block diagram display section 320 based on the display data stored in the display data storage 214. As a result, result data 361 indicating the execution result of the program module is displayed on the block diagram display section 320 (see FIG. 10).

In Step S42, the simulation unit 228 confirms whether the execution mode is the continuous mode. If it is determined in Step 842 that the execution mode is the step mode, the programming support apparatus 3 executes Step S43. In Step S43, the simulation unit 228 confirms whether execution of the set of program modules has been completed. If it is determined in Step S43 that the execution of the set of program modules has not been completed, the programming support apparatus 3 returns the process to Step S37. Thereafter, selection and execution of a program nodule according to the sequence data may be repeated until execution of the set of program modules is completed.

If it is determined in Step S43 that the execution of the set of program modules has been completed, the programming support apparatus 3 executes Step S44. In Step S44, the simulation unit 228 interrupts the execution of the program module. Thereafter, the programming support apparatus 3 returns the process to Step S31.

If it is determined in Step S42 that the execution mode is the continuous mode, the programming support apparatus 3 executes Step S45. In Step S45, the simulation unit 228 confirms the presence or absence of a simulation stop command (for example, clicking of the stop button 316). If it is determined in Step S45 that there is no simulation stop command, the programming support apparatus 3 returns the process to Step S37. Thereafter, selection and execution of a program module according to the sequence data are repeated until it is determined that there is a simulation stop command. If it is determined in Step S45 that there is a simulation stop command, the programming support apparatus 3 stops the process. The simulation procedure may then be completed as above.

Sequence Registration Procedure

The programming support apparatus 3 sequentially may execute

Figure 11:
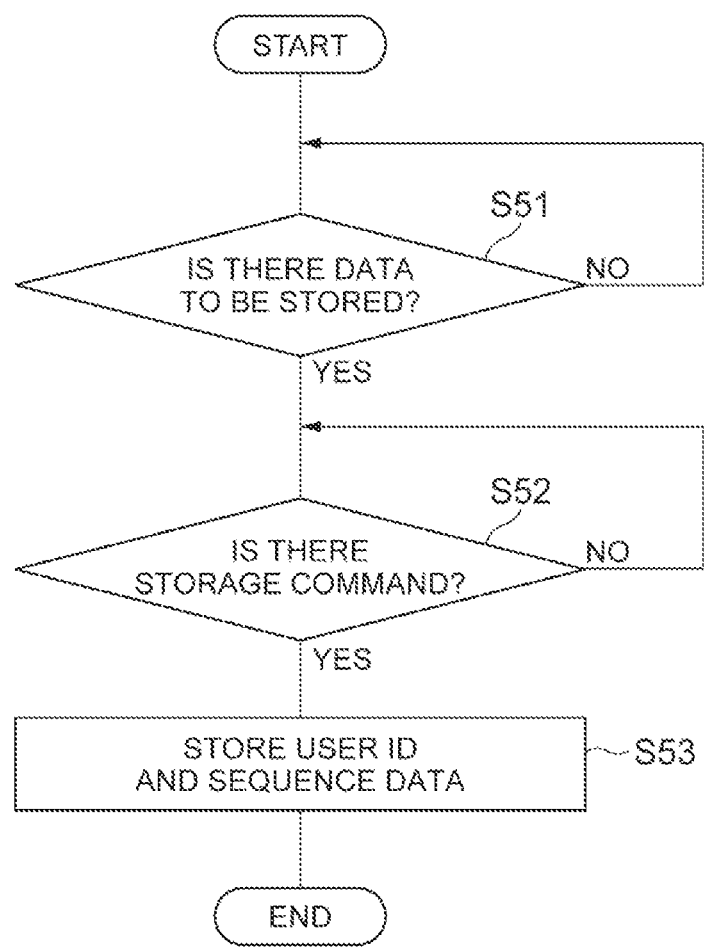
FIG. 11 is a flowchart illustrating an example sequence data registration procedure.

Steps S51, S52, and S53 in performing the example sequence registration procedure illustrated in FIG. 11. In Step S51, the sequence data registration unit 231 waits for storage of sequence data, which is stored in the sequence storage 114, in the sequence storage 215. In Step S52, the sequence data registration unit 231 waits for a sequence data registration command (for example, a user input such as clicking of the write button 313). In Step S53, the sequence data registration unit 231 stores the sequence data stored in the sequence storage 215 by the compilation unit 225 and arty of the IDs stored in the ID storage 211 in the sequence storage 114 of the power conversion apparatus 2 to be associated with each other. The sequence registration procedure may then be completed as above.

As described above, the example power conversion system 1 may include the power conversion apparatus 2 including the power conversion circuitry 10, the program storage 111 that stores the control program configured to control the power conversion circuitry 10, and the control unit 112 that controls the power conversion circuitry 10 according to the control program. The power conversion system 1 may additionally include the programming support apparatus 3 connected to the power conversion apparatus 2. The programming support apparatus 3 includes the display data generation unit 221 that generates the display data of the block diagram 321 illustrating the content of the control program using the plurality of functional blocks 322 and the link 323 indicating input and output of information between the functional blocks 322 based on the control program stored in the program storage 111.

The content of the control program stored in the power conversion apparatus 2 can be easily displayed as information flow between the functional blocks 322 by the programming support apparatus 3 in order to reduce the work of editing the control program.

The program storage 111 may include the module storage 113 that stores the plurality of program modules, and the sequence storage 114 that stores the sequence data indicating the execution order of the plurality of program modules. The programming support apparatus 3 may further include the block storage 212 that stores the plurality of functional blocks 322 in association with any of the plurality of program modules. The display data generation unit 221 may generate the display data of the block diagram 321 based on the sequence data stored in the sequence storage 215 and the corresponding relationship between the functional block 322 of the block storage 212 and the program module. In this case, display data of the information flow between the functional blocks 322 may be generated while suppressing an increase in the amount of information to be stored on the power conversion apparatus 2 side.

The functional block 322 may include the input terminal 324 associated with the program module for information input and/or the output terminal 325 associated with the program module for information output. Additionally, the display data generation unit 221 may generate the display data of the block diagram 321 such that the output terminal 325 of one of the functional blocks 322 and the input terminal 324 of any other functional block 322 are connected by the link 323. In this case, the display data of the link 323 may be easily generated based on the corresponding relationship between the terminal of the functional block 322 (the input terminal 324 or the output terminal 325) and the program module.

The display data generation unit 221 may include the arrangement setting unit 222 that sets the arrangement of the functional blocks 322, and the link data generation unit 223 that generates the display data of the link. When the program module associated with the input terminal 324 of the other functional block 322 is positioned next to the program module associated with the output terminal 325 of one of the functional blocks 322 in the sequence data stored in the sequence storage 215, the arrangement setting unit 222 may set the arrangement of the functional blocks 322 such that the position of the one functional block 322 and the position of the other functional block 322 differ in the first direction. Additionally, the link data generation unit 223 may generate the display data of the link. 323 such that the output terminal 325 of the one functional block 322 and the input terminal 324 of the other functional block 322 are connected to each other. In this case, the content of the control program can be more easily grasped by arranging the functional blocks 322 along the flow of information.

When the program module associated with the output terminal 325 of the other functional block 324 is positioned next to the program module associated with the input terminal 324 or the output terminal 325 of the one functional block 322 in the sequence data stored in the sequence storage 215, the arrangement setting unit may set the arrangement of the functional blocks 322 such that the position of the one functional block 322 and the position of the other functional block 322 differ in the second direction intersecting with the first direction. In this case, the content of the control program can be more easily grasped by displaying the flow of a plurality of pieces of information in parallel.

The programming support apparatus 3 may further include the compilation unit 225 that generates the sequence data based on the arrangement of the functional blocks 322 in the block diagram 321 and the link 323. In this case, the editing result of the control program on the block diagram 321 can be easily reflected on the sequence data.

The sequence storage 215 may be configured to store an ID of a user who has generated the sequence data in addition to the sequence data. The programming support apparatus 3 may further include the ID storage 211 that stores an ID of a user of the own apparatus and the sequence data registration unit 231 that stores the sequence data generated by the compilation unit 225 and any of the IDs stored in the ID storage 211 in the sequence storage 215 to be associated with each other. At least one of the programming support apparatus 3 and the power conversion apparatus 2 may further include the security management unit 218 that prohibits generation of display data based on the control program stored in the program storage 111 when the ID stored in the sequence storage 215 does not match the ID stored in the ID storage 211. In this case, the information in the power conversion apparatus 2 can be protected with high reliability.

The ID storage 211 may be configured to store IDs of a plurality of users. The security management unit 218 may be provided in the programming support apparatus 3 and configured to permit the generation of display data based on the control program stored in the program storage 111 when the ID stored in the sequence storage 114 matches any of the IDs stored in the ID storage 211. In this case, the control program of the plurality of power conversion apparatuses 2 may be edited with the single programming support apparatus 3.

The example programming support apparatus 3 may further include the input data setting unit 226 that sets the virtual input data for at least some of the functional blocks 322 in the block diagram 321, and the corresponding program storage 213 that stores a plurality of program modules respectively corresponding to the plurality of program modules stored in the module storage 113. Additionally, the programming support apparatus 3 may include the simulation unit 228 that executes the program module stored in the corresponding program storage 213 based on the sequence data generated by the compilation unit 225 and the virtual input data set by the input data setting unit 226, and the result display data generation unit 229 that generates the overwrite data configured to display the execution result of the program module by the simulation unit 228 together with the block diagram 321. In this case, a new control program may be verified without operating the power conversion apparatus 2.

The input data setting unit 226 may be configured to set the input data of the waveform based on the waveform designation including the cycle and the amplitude. In this case, the new control program may be verified under more diverse conditions in order to set the input data of the waveform.

The programming support apparatus 3 may further include the mode setting unit 227 that sets the simulation execution mode to any of the plurality of modes. For example, the plurality of nodes may include the continuous mode in which execution of a series of program modules according to sequence data is repeated and the step mode in which execution of a program module is interrupted whenever one or more program modules are executed. The simulation unit 228 may execute the program module stored in the corresponding program storage 213 in the execution mode set by the mode setting unit 227. In this case, a new control program may be verified in more detail by allowing simulation in the step mode.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:

1. A power conversion system comprising:
a power conversion apparatus including:
power conversion circuitry;
program storage configured to store a control program for controlling the power conversion circuitry, a plurality of program modules, and sequence data indicating an execution order of at least two of the program modules; and
control circuitry configured to control the power conversion circuitry according to the control program; and
a programming support apparatus connected to the power conversion apparatus, wherein the programming support apparatus includes:
support circuitry configured to generate a block diagram illustrating a content of the control program and which is displayed using a plurality of functional blocks and a link indicating input and output of information between the functional blocks based on the control program stored in the program storage; and
block storage configured to store each of the functional blocks in association with at least one of the program modules,
wherein the functional blocks include a first functional block including an output terminal associated with one of the program modules for information output and a second functional block including an input terminal associated with one of the program modules for information input,
wherein the execution order indicated by the sequence data includes a first program module associated with the output terminal of the first functional block and a second program module associated with the input terminal of the second functional block, and
wherein the support circuitry is configured to set an arrangement of the functional blocks and to generate the link such that, when the second program module is positioned next to the first program module in the sequence data, a position of the first functional block and a position of the second functional block differ in a first direction, and the output terminal of the first functional block and the input terminal of the second functional block are connected to each other by the link.

2. The power conversion system according to claim 1, wherein the support circuitry is further configured to set the arrangement of the functional blocks and to generate the link such that, when the first program module is positioned next to the second program module in the sequence data, the position of the first functional block and the position of the second functional block differ in a second direction intersecting with the first direction.

3. The power conversion system according to claim 1, wherein the support circuitry is further configured to generate the sequence data based on the arrangement of the functional blocks in the block diagram and the link.

4. The power conversion system according to claim 3, wherein the program storage is configured to store a first user ID associated with a first user who has generated the sequence data in addition to storing the sequence data,
wherein the programming support apparatus further includes ID storage configured to store a second user ID associated with a second user of the programming support apparatus,
wherein the support circuitry is configured to write the generated sequence data and the second user ID in the program storage so that the generated sequence data is associated with both the first user ID and the second user ID, and
wherein at least one of the support circuitry and the control circuitry is further configured to prohibit generation of the block diagram based on the control program stored in the program storage when the first user ID does not match the second user ID.

5. The power conversion system according to claim 4, wherein the ID storage is configured to be capable of storing second user IDs of a plurality of users including the second user ID of the second user, and
wherein the support circuitry is configured to permit generation of the block diagram based on the control program stored in the program storage when the first user ID stored in the program storage matches any of the second user IDs stored in the ID storage.

6. The power conversion system according to claim 3, wherein the programming support apparatus further includes corresponding program storage configured to store a plurality of program modules respectively corresponding to the plurality of program modules stored in the program storage; and
wherein the support circuitry is further configured to:
set virtual input data for at least one of the functional blocks in the block diagram;
execute the program modules stored in the corresponding program storage based on the generated sequence data and the virtual input data; and
generate overwrite data configured to display an execution result of the program modules together with the block diagram.

7. The power conversion system according to claim 6, wherein the support circuitry is configured to set the virtual input data of a waveform based on a waveform designation including a cycle and an amplitude.

8. The power conversion system according to claim 6, wherein the support circuitry is further configured to set an execution mode of the program modules stored in the corresponding program storage to any of a plurality of modes including a continuous mode in which execution of a series of the program modules according to the sequence data is repeated and a step mode in which execution of the program module is interrupted whenever one or a plurality of the program modules is executed.

9. A programming support method comprising:
reading a control program configured to control power conversion circuitry from a power conversion apparatus having the power conversion circuitry;
reading, from the power conversion apparatus, a plurality of program modules and sequence data indicating an execution order of at least two of the program modules;
generating a block diagram illustrating a content of the control program and which is displayed using a plurality of functional blocks and a link indicating input and output of information between the functional blocks based on the control program, wherein the functional blocks include a first functional block including an output terminal associated with one of the program modules for information output and a second functional block including an input terminal associated with one of the program modules for information input, and wherein the execution order indicated by the sequence data includes a first program module associated with the output terminal of the first functional block and a second program module associated with the input terminal of the second functional block; and setting an arrangement of the functional blocks such that, when the second program module is positioned next to the first program module in the sequence data, a position of the first functional block and a position of the second functional block differ in a first direction, and the output terminal of the first functional block and the input terminal of the second functional block are connected to each other by the link.

10. The program support method according to claim 9, wherein said setting the arrangement of the functional blocks includes setting the arrangement of the functional blocks and to generate the link such that, when the first program module is positioned next to the second program module in the sequence data, the position of the first functional block and the position of the second functional block differ in a second direction intersecting with the first direction.

11. The program support method according to claim 9, further comprising generating the sequence data based on the arrangement of the functional blocks in the block diagram and the link.

12. The program support method according to claim 11, further comprising:

reading, from the power conversion apparatus, a first user ID associated with a first user who has generated the sequence data in addition to reading the sequence data from the power conversion apparatus;

writing, into the power conversion apparatus, the generated sequence data and a second user ID associated with a second user so that the generated sequence data is associated with both the first user ID and the second user ID; and prohibiting generation of the block diagram based on the control program read from the power conversion apparatus when the first user ID does not match the second user ID.

13. The program support method according to claim 12, wherein the power conversion apparatus is configured to store second user IDs of a plurality of users including the second user ID of the second user, and wherein the method further comprises permitting generation of the block diagram based on the control program read from the power conversion apparatus when the first user ID matches any of the second user IDs stored in the power conversion apparatus.

14. The program support method according to claim 11, further comprising:

setting virtual input data for at least one of the functional blocks in the block diagram;

executing a plurality of corresponding program modules based on the generated sequence data and the virtual input data, wherein the corresponding program modules is the plurality of program modules read out from the power conversion apparatus and stored outside the power conversion apparatus; and generating overwrite data configured to display an execution result of the program modules together with the block diagram.

15. The program support method according to claim 14, wherein said setting the virtual input data includes setting the virtual input data of a waveform based on a waveform designation including a cycle and an amplitude.

16. The program support method according to claim 14, further comprising setting an execution mode of the corresponding program modules to any of a plurality of modes including a continuous mode in which execution of a series of the corresponding program modules according to the sequence data is repeated and a step mode in which execution of the corresponding program module is interrupted whenever one or a plurality of the program modules is executed.

17. A power conversion system comprising:

a power conversion apparatus including power conversion circuitry, program storage configured to store a control program for controlling the power conversion circuitry, and control circuitry configured to control the power conversion circuitry according to the control program; and a programming support apparatus connected to the power conversion apparatus, wherein the programming support apparatus includes:

support circuitry configured to:

generate a block diagram illustrating a content of the control program and which is displayed using a plurality of functional blocks and a link indicating input and output of information between the functional blocks based on the control program stored in the program storage; and generate sequence data based on an arrangement of the functional blocks in the block diagram and the link, wherein the program storage is configured to store a plurality of program modules and the sequence data indicating an execution order of at least two of the program modules, and wherein the program storage is configured to store a first user ID associated with a first user who has generated the sequence data in addition to storing the sequence data;

block storage configured to store each of the functional blocks in association with at least one of the program modules, wherein the support circuitry is configured to generate the block diagram based on the sequence data stored in the program storage and a corresponding relationship between the functional blocks and the program module in the block storage; and ID storage configured to store a second user ID associated with a second user of the programming support apparatus, wherein the support circuitry is configured to write the generated sequence data and the second user ID in the program storage so that the generated sequence data is associated with both the first user ID and the second user ID, and wherein at least one of the support circuitry and the control circuitry is further configured to prohibit generation of the block diagram based on the control program stored in the program storage when the first user ID does not match the second user ID.

18. The power conversion system according to claim 17, wherein the functional blocks include a first functional block including an output terminal associated with one of the program modules for information output and a second functional block including an input terminal associated with one of the program modules for information input, and wherein the support circuitry is configured to generate the block diagram such that the output terminal of the first functional block and the input terminal of the second functional block are connected by the link.

19. A power conversion system comprising:
a power conversion apparatus including power conversion circuitry, program storage configured to store a control program for controlling the power conversion circuitry, and control circuitry configured to control the power conversion circuitry according to the control program; and
a programming support apparatus connected to the power conversion apparatus, wherein the programming support apparatus includes:
support circuitry configured to:
   generate a block diagram illustrating a content of the control program and which is displayed using a plurality of functional blocks and a link indicating input and output of information between the functional blocks based on the control program stored in the program storage; and
   generate sequence data based on an arrangement of the functional blocks in the block diagram and the link, wherein the program storage is configured to store a plurality of program modules and the sequence data indicating an execution order of at least two of the program modules;
block storage configured to store each of the functional blocks in association with at least one of the program modules, wherein the support circuitry is configured to generate the block diagram based on the sequence data stored in the program storage and a corresponding relationship between the functional blocks and the program module in the block storage; and
corresponding program storage configured to store a plurality of program modules respectively corresponding to the plurality of program modules stored in the program storage, and
wherein the support circuitry is further configured to:
   set virtual input data for at least one of the functional blocks in the block diagram;
   execute the program modules stored in the corresponding program storage based on the generated sequence data and the virtual input data; and
   generate overwrite data configured to display an execution result of the program modules together with the block diagram.

20. The power conversion system according to claim 19, wherein the functional blocks include a first functional block including an output terminal associated with one of the program modules for information output and a second functional block including an input terminal associated with one of the program modules for information input, and
   wherein the support circuitry is configured to generate the block diagram such that the output terminal of the first functional block and the input terminal of the second functional block are connected by the link.

* * * * *